(12) United States Patent
Okamoto et al.

(10) Patent No.: US 7,436,540 B2
(45) Date of Patent: Oct. 14, 2008

(54) IMAGE RECORDER HAVING MORE THAN ONE RECORDING HEAD AND IMAGE RECORDING SYSTEM CONTAINING THE IMAGE RECORDER

(75) Inventors: Hiroshi Okamoto, Kyoto (JP); Masahiro Nishida, Kyoto (JP); Ichirou Watanabe, Kyoto (JP); Yoshihiro Katsuma, Kyoto (JP)

(73) Assignee: Dainippon Screen Mgf. Co., Ltd., Kyoto (JP)

( * ) Notice: Subject to any disclaimer, the term of this patent is extended or adjusted under 35 U.S.C. 154(b) by 915 days.

(21) Appl. No.: 10/241,463

(22) Filed: Sep. 12, 2002

(65) Prior Publication Data

US 2003/0048467 A1    Mar. 13, 2003

(30) Foreign Application Priority Data

Sep. 13, 2001    (JP)    ............................ P2001-277488

(51) Int. Cl.
*B41J 1/00*    (2006.01)
*G06F 15/00*    (2006.01)

(52) U.S. Cl. ...................... 358/1.18; 358/1.2; 358/1.12; 347/116; 347/117; 347/118; 347/154; 347/157

(58) Field of Classification Search ................. 358/1.12, 358/1.2, 1.18; 347/116–118, 154, 157
See application file for complete search history.

(56) References Cited

U.S. PATENT DOCUMENTS

| | | | |
|---|---|---|---|
| 4,576,490 A * | 3/1986 | Isobe | ........................... 400/82 |
| 5,428,375 A * | 6/1995 | Simon et al. | .................. 347/12 |
| 5,609,448 A | 3/1997 | Oohara et al. | |
| 5,663,802 A | 9/1997 | Beckett et al. | |
| 5,717,451 A | 2/1998 | Katano et al. | |
| 5,765,094 A * | 6/1998 | Nakamura | ................... 399/406 |
| 5,887,525 A | 3/1999 | Okamura et al. | |
| 5,894,319 A * | 4/1999 | Okamura et al. | ............. 347/264 |
| 6,050,674 A * | 4/2000 | Hirabayashi et al. | .......... 347/40 |
| 6,076,464 A | 6/2000 | Okamura | |
| 6,563,601 B1 * | 5/2003 | Yamada et al. | ................ 358/1.9 |

FOREIGN PATENT DOCUMENTS

| | | |
|---|---|---|
| EP | 0 918 255 A2 | 5/1999 |
| EP | 1 004 435 A1 | 5/2000 |
| JP | 09-66595 | 3/1997 |
| JP | 9-185196 | 7/1997 |
| JP | 2000-272078 A | 10/2000 |
| JP | 2001-191550 A | 7/2001 |
| JP | 2002-333723 A | 11/2002 |

* cited by examiner

*Primary Examiner*—David Moore
*Assistant Examiner*—Peter K Huntsinger
(74) *Attorney, Agent, or Firm*—McDermott Will & Emery LLP

(57) ABSTRACT

A control part comprises a division location setting part for setting a division location based on an image data; a scan start position setting part for setting scan start positions of recording heads based on the division location; an image data division part for dividing an image data by the division location; and a head movement control part for controlling movement of the recording heads. The division location setting part sets a division location in a blank area having no pixel to be recorded in the primary scanning direction, in the case of publication printing, in a center margin area between page data. Since the recording heads perform scanning concurrently their respective areas that are divided by the division location, no deterioration in image continuity occurs between the recording heads. This permits an image recorder, though having plural recording heads, capable of performing concurrent recordings without loss of continuity.

2 Claims, 11 Drawing Sheets

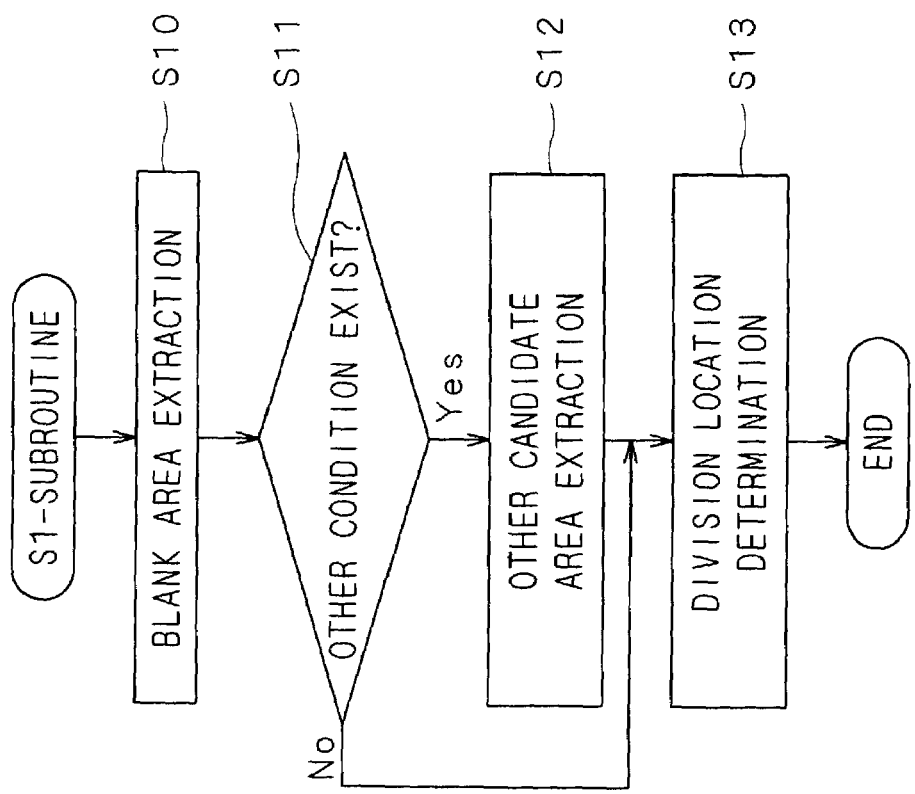
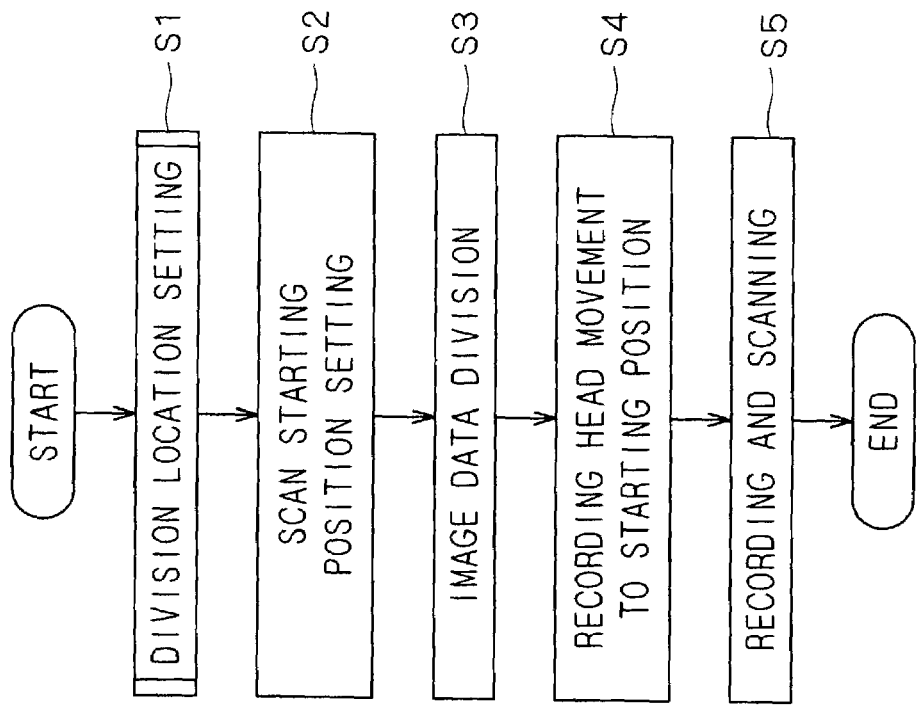

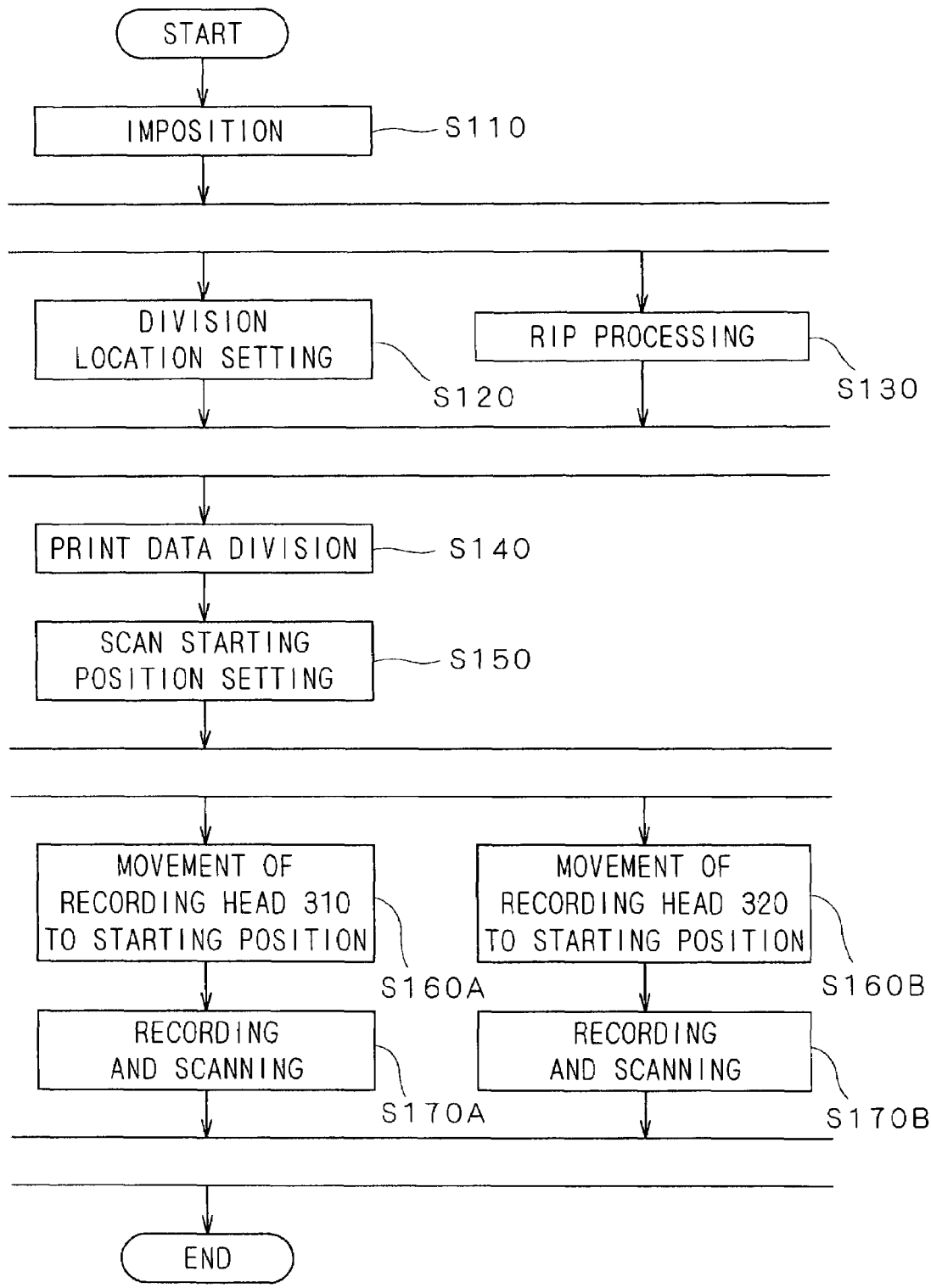

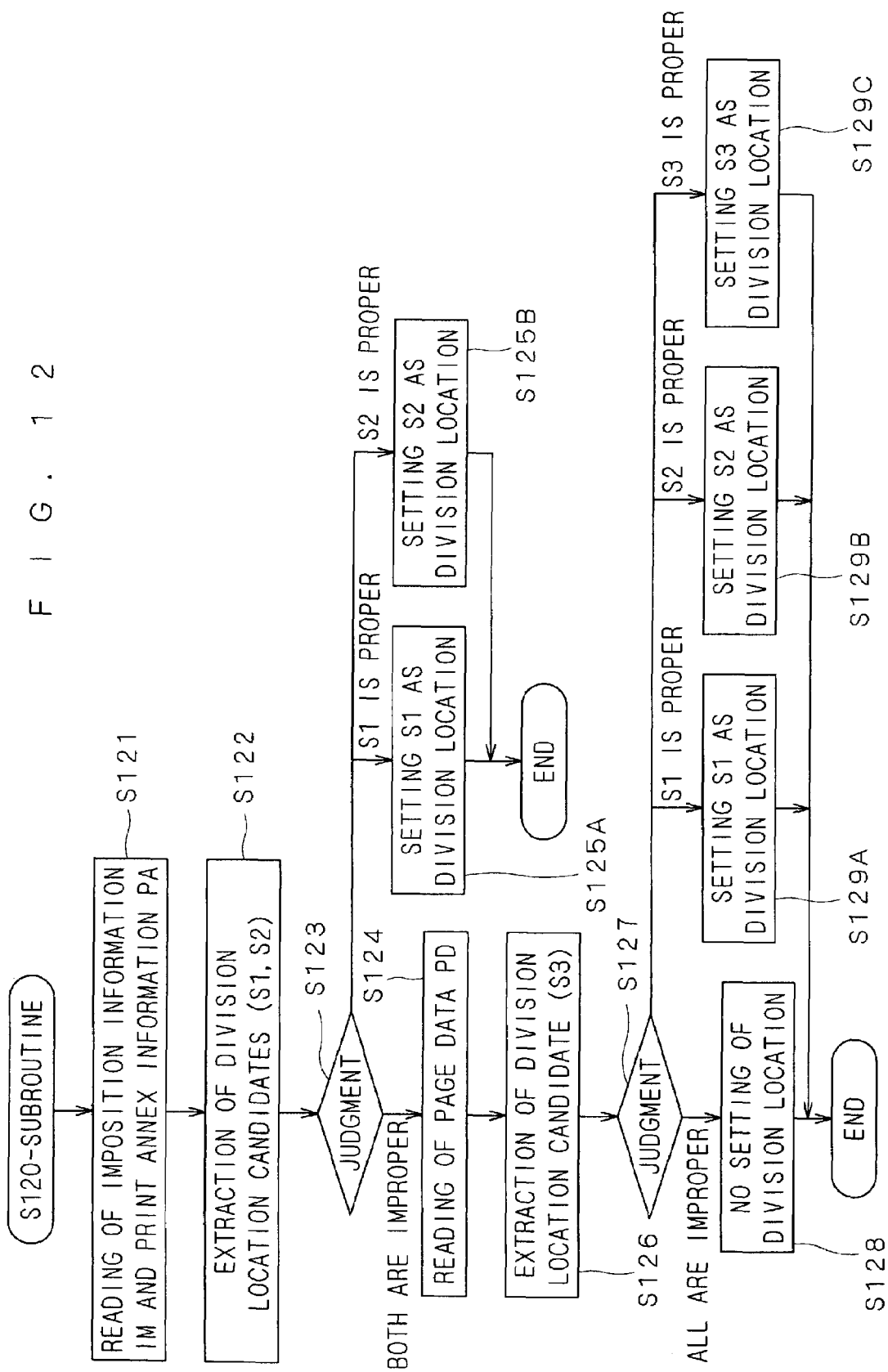

IMAGE RECORDER HAVING MORE THAN ONE RECORDING HEAD AND IMAGE RECORDING SYSTEM CONTAINING THE IMAGE RECORDER

BACKGROUND OF THE INVENTION

1. Field of the Invention

The present invention relates to an image recorder that records image on a recording material such as a printing plate and photosensitive film. In particular, the invention relates to an image recorder having more than one recording head for recording image.

2. Description of the Background Art

There is known an image recorder that records image on a printing plate based on an image data, which is called "CTP (computer to plate) device." In the most widespread type of this CTP device, with a printing plate mounted on a drum, a secondary scanning of a recording head in an axial direction of the drum is performed while the drum is rotated in a primary scanning direction, thereby recording image in spiral form with respect to the peripheral surface of the drum. This image recorder aims at increasing the recording rate of the image recorder as a whole, by using a recording head of a multibeam type in which plural beam columns are disposed. However, the above spiral recording system is unsatisfactory due to the problem that the tilting of image recorded in spiral is increased as the number of beam columns is increased.

To solve this problem, there is known a technique of increasing recording rate by arranging such that plural recording heads for recording images perform concurrent scanning over plural areas on a printing plate. In this conventional image recorder, plural recording heads are disposed in a secondary scanning direction so that the individual recording heads record image concurrently.

However, when an image is divided and recorded by the plural recording heads as described above, it is difficult to maintain continuity at a joint between the recording heads. Although in the conventional image recorder, a spot position of each recording head is detected to correct an irradiation position, a slight line unevenness etc. might occur because of difficulties in attaining a complete correction, which can deteriorate printing quality.

SUMMARY OF THE INVENTION

The present invention is directed to an image recorder that records image on a recording material by scanning over the recording material based on image data.

According to this invention, the image recorder includes: a holding part that holds a recording material in an approximately cylindrical shape; plural recording heads that are movable in an axial direction in an approximately cylindrical shape and capable of individually scanning on a recording material held by the holding part; a division location setting part that sets a division location of the image data based on image layout information in the image data; an image data division part that divides the image data into plural areas corresponding to the plural recording heads, respectively, based on the division location so set; a scan start position setting part that sets scan start positions of the plural recording heads based on each of image data divided into the plural areas; and a head movement control part that directs the plural recording heads to movably scan in the axial direction from scan start positions so set, so that the plural recording heads perform image recording concurrently.

In an image recorder having more than one recording head, high-speed concurrent recording is attainable while maintaining image continuity.

Preferably, the image data is an imposition image data composed of a layout of plural page data, and the division location setting part sets the division location within a margin area between adjacent page data among the plural page data.

Especially in the field of prepress and printing, setting the division location within a margin area of imposed page data exerts no influence on image quality.

Preferably, when the division location setting part sets the division location in the margin area subjected to burning out, the scan start position setting part sets scan start positions of the plural recording heads such that scan recording areas across the division location are overlapped with each other.

When a division location is set in a margin area requiring burning out, no remainder occurs by overlapping the divided image areas.

This invention is also directed to an image recording system that includes an image data supply part for supplying an image data; a holding part for holding a recording material in an approximately cylindrical shape; and plural recording heads movable in an axial direction of an approximately cylindrical shape and capable of individually scanning over a recording material, and that records image in a recording material by scanning over the recording material while driving the plural recording heads based on the image data.

This invention is also directed to an image recording method for recording image on a recording material by scanning over the recording material based on an image data.

Therefore, an object of the present invention is to provide an image recorder having plural recording heads that can perform recording without loss of image continuity.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a flowchart of an operation procedure of the image recorder in FIG. 1;

FIGS. 11 and 12 are flowcharts of an operation procedure of the image recording system in FIG. 6.

DESCRIPTION OF THE PREFERRED EMBODIMENTS

Figure 1:
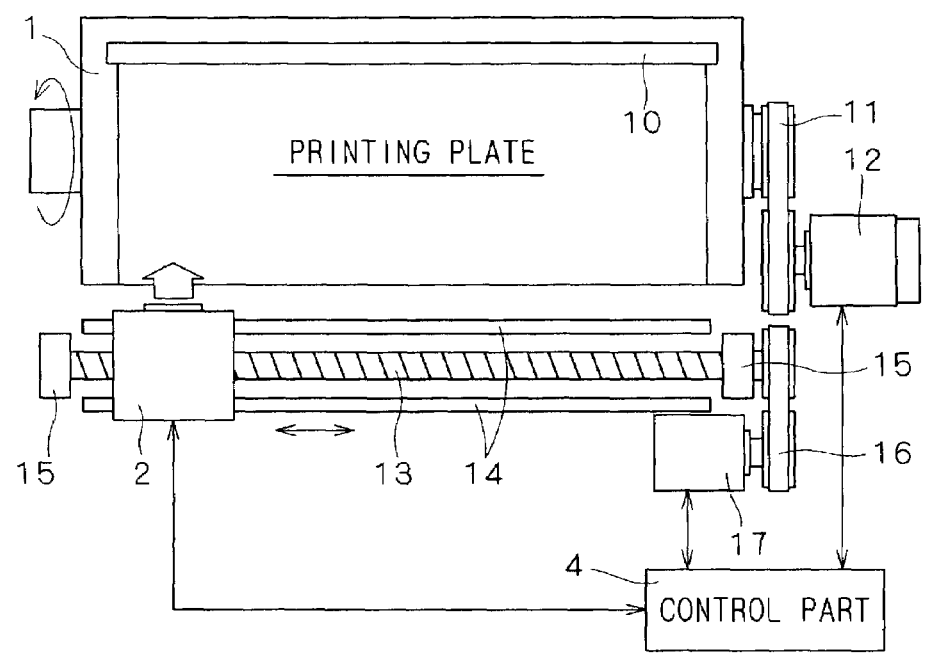
FIG. 1 is a schematic plan view showing one example of an image recorder according to the present invention.
Figure 2:
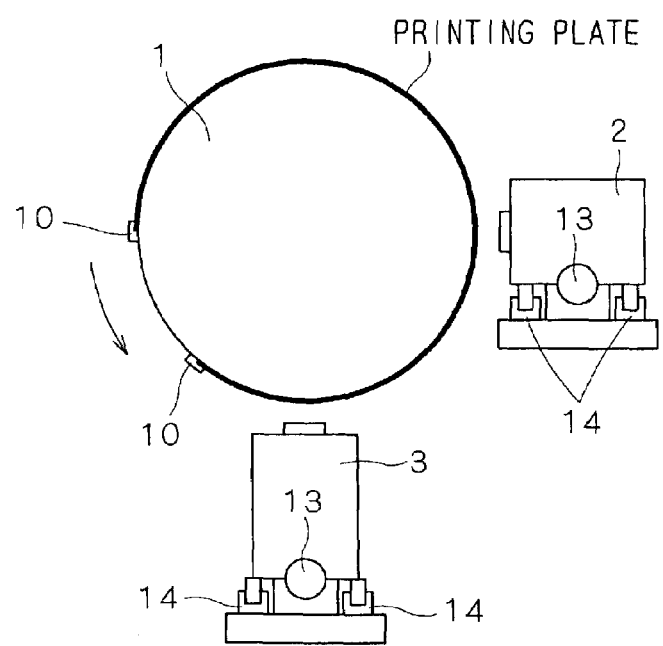
FIG. 2 is a schematic side view of the image recorder in FIG. 1.

A first preferred embodiment of the invention will be described based on the accompanying drawings. One example of an image recorder according to this invention is shown in FIG. 1 that is a schematic plan view when a major part of the image recorder is viewed from above. FIG. 2 is a side view of the major part of the image recorder. Referring to these drawings, the image recorder comprises a drum 1 that can rotate while holding a recording material; two recording heads 2 and 3 that can move in an axial direction of the drum 1; and a control part 4 to control the image recorder. In FIG. 1, the recording head 3 is not shown because it is present immediately below the drum 1.

The drum 1 holds around its peripheral surface a sheet-like recording material in an approximately cylindrical shape and has a pair of clamp members 10 for clamping both ends of the recording material, as shown in FIG. 2. The drum 1 is rotatably driven by a drive motor 12 via a belt member 11. Instead of or together with the clamp members 10, an adsorption part for holding the recording material may be provided.

The recording head 2 in engagement with a ball screw 13 extending in parallel to the axis of the drum 1 is mounted on two guide rails 14 extending like the ball screw 13. The ball screw 13 are rotatably supported at its both ends by screw support members 15 and rotatably driven by a drive motor 17 through a belt member 16. In this moving mechanism, when the drive motor 17 is rotated, the recording head 2 moves in the axial direction of the drum 1.

The recording head 3 has a similar moving mechanism independently of that of the recording head 2, which permits individual movement in the axial direction of the drum 1. Therefore, a description of the moving mechanism of the recording head 3 is omitted here, and the same parts as in the moving mechanism of the recording head 2 are identified by the same reference numerals. In this preferred embodiment, the recording heads 2 and 3 are disposed such that their phases are respectively shifted about 90 degrees with respect to the circumferential surface of the drum 1. Thereby, the recording head 2 moves at approximately the same height as the axis of the drum 1, whereas the recording head 3 moves immediately below the drum 1. As the result, the recording heads 2 and 3 do not interfere with each other. It is noted that the direction of rotation of the drum 1 is hereinafter referred to as a "primary scanning direction" and the direction of movement of the recording heads 2 and 3 is hereinafter referred to as a "secondary scanning direction."

The recording heads 2 and 3 are of multibeam type in which an irradiation mechanism (not shown) capable of concurrently irradiating plural beams is disposed in an approximately axial direction of the drum 1. As this beam irradiation mechanism, there is used for example such a beam array that light emitting devices such as LEDs or semiconductor lasers are disposed linearly. The emissions of the light emitting devices are individually controlled based on an image data. Therefore, during a primary scanning rotation of the drum 1, the recording heads 2 and 3 can record image by a width corresponding to the number of beams provided in the recording heads 2 and 3, respectively. For instance, assuming that recording heads 2 and 3 have respectively 64 channels in the number of beams, when the recording heads 2 and 3 are operated concurrently to make one complete rotation, a 128-channel-width recording is attainable at a time.

The control part 4 is a computer system connected to each part of the image recorder and functions to control the entire image recorder under a predetermined program. The following description of this preferred embodiment is related to a secondary scanning feed control of the recording heads 2 and 3, as well as a division supply control of image data to the recording heads 2 and 3.

Figure 3:
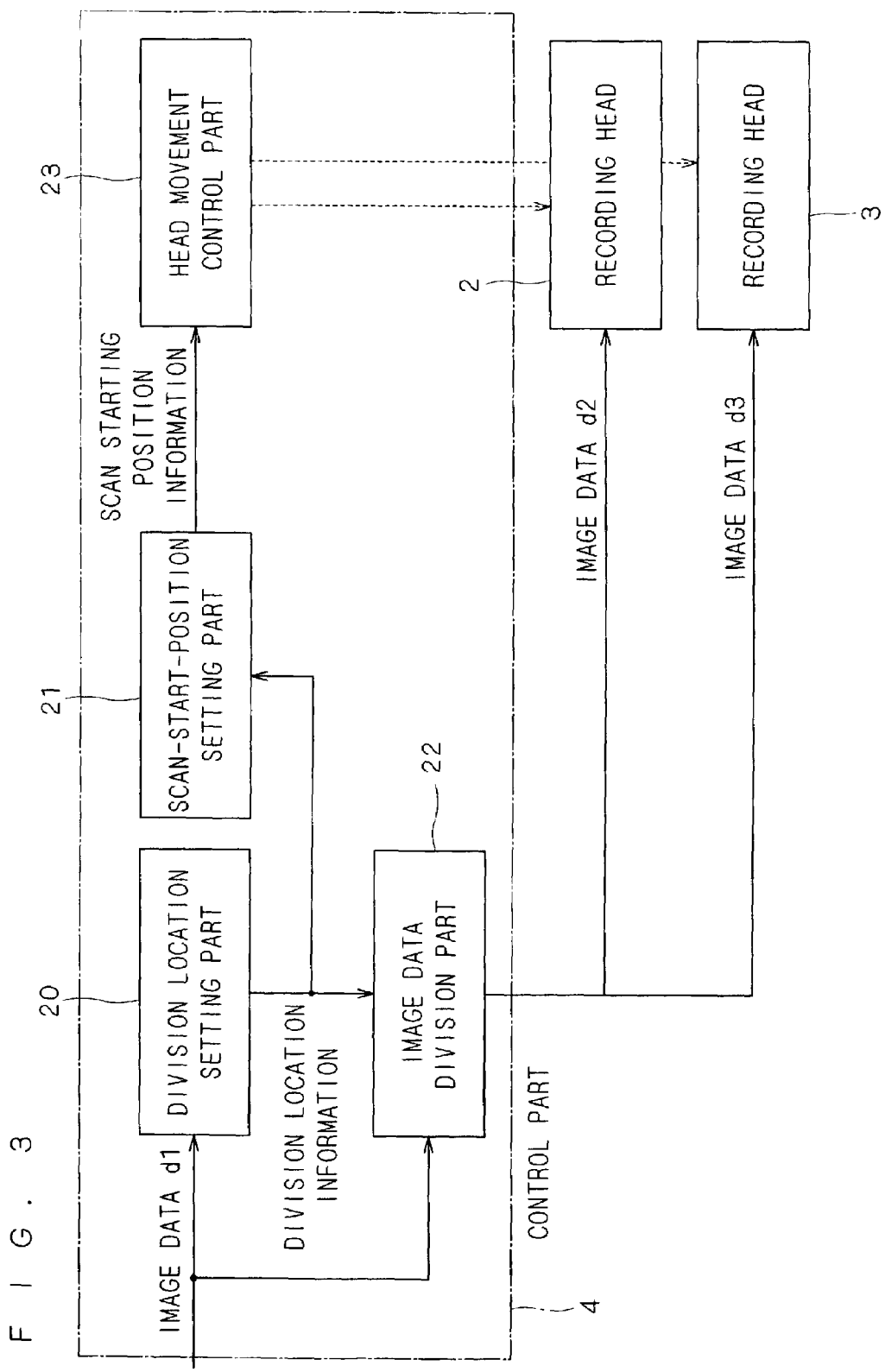
FIG. 3 is a functional block diagram of a control part of the image recorder in FIG. 1.

FIG. 3 is a block diagram functionally showing the control part 4. In FIG. 3, the control part 4 comprises a division location setting part 20 for setting a division location based on an image data, a scan-start-position setting part 21 that sets a scan start position of each recording head based on the division location, an image data division part 22 for dividing an image data based on the division location, and a head movement control part 23 for controlling movement of the recording heads 2 and 3. It is noted that in this preferred embodiment, a binary image data d1 of after-RIP (raster image processing)-development is inputted from other image data processing part to the control part 4.

Figure 5:
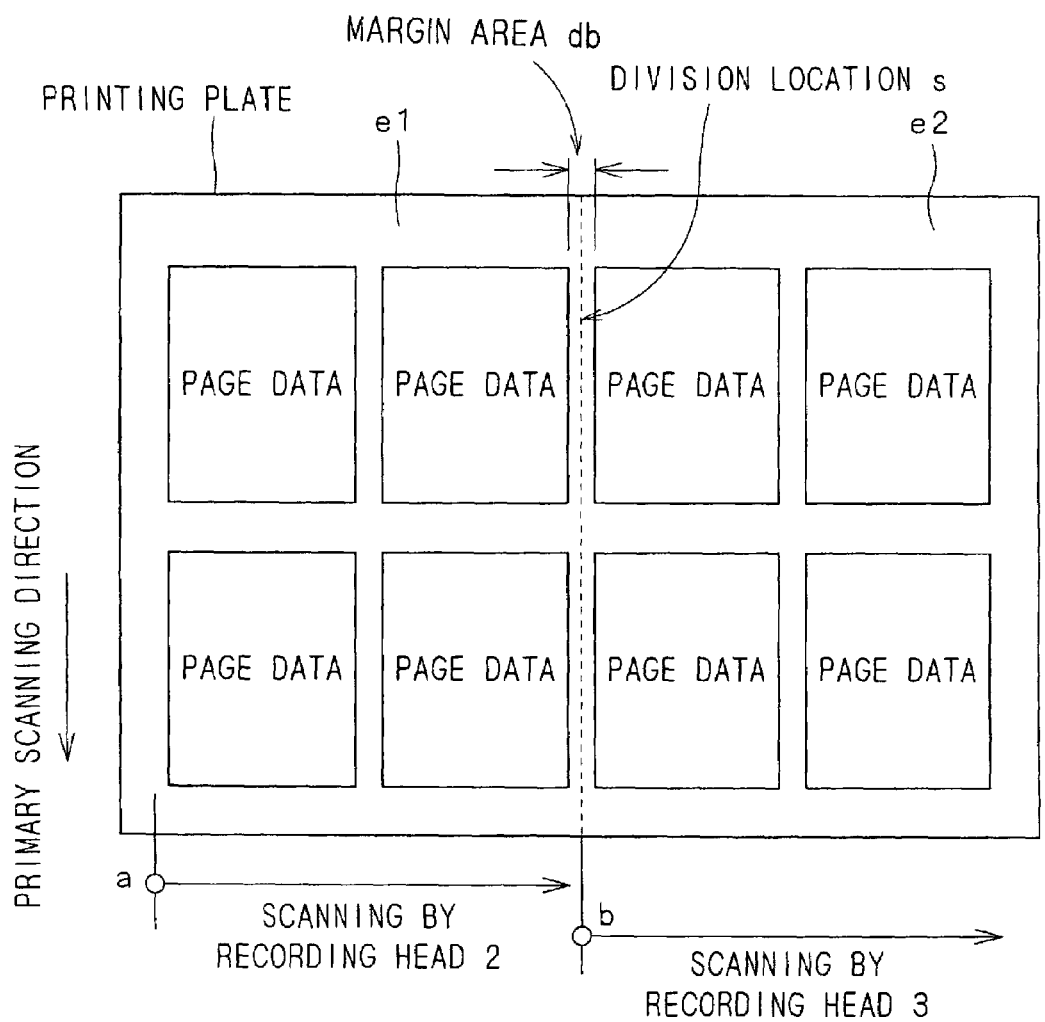
FIG. 5 is an explanatory diagram of a center margin area and a division location of an imposed image data.

The division location setting part 20 analyzes the image data d1 to be recorded on a printing plate thus to set a division location at which the image data d1 is divided. As this division location, such a blank area is selected which has no pixel to be recorded in the primary scanning direction on the image data d1 (or which has a predetermined pixel number or less in consideration of various noises). FIG. 5 is an explanatory diagram showing one example of a printing plate with which a publication printing such as a pamphlet and book is to be done. In FIG. 5, a 8-page imposition is shown. In this publication printing, there is provided blank areas intervening between adjacent pages. These blank areas are called "margin areas" (hereinafter referred to as "margin areas db"). To the margin area db, no image recording is performed or an overall recording called "burning out" is performed, so that no print image is usually recorded. In the publication printing, it is most suitable for the present invention to set a division location s in the margin area db disposed in the primary scanning direction. In this specification, the margin area db that is subjected to the burning-out processing is also taken as a blank area, for the sake of convenience.

Since no image is usually recorded in the above-mentioned margin areas db, the division location s may be set at an approximately center of a selected margin area db. If a register mark or various patches are recorded in the margin area db, it is preferable to perform a division such that the register mark falls within either the front or rear area of the division location. In the case of about the horizontal line of the register mark, it is not essential to fall within either area. On the other hand, it is desirable to determine a division location s such that various patches fall within a single area. Instead of being restricted to the publication printing, a gap between composed image areas or character areas may be selected as a blank area in place of the margin area.

Meanwhile, depending on the picture of a printed matter, there can be no blank area in the primary scanning direction. In this case, the least influence area is selected under a preset condition. In an alternative, such an area judged as having a relatively small number of image parts in the primary scanning direction may be selected as a sparse-image area, and a division location s may be set in the sparse-image area. In other alternative, either halftone image or line art image takes precedence in before-RIP-development image data, and an area not containing these priority images may be extracted and selected. In still other alternative, an area of a color exerting less influence may be selected by estimating a print color from an image data. For example, yellow is a preferred condition for setting a division location s, because the discontinuity in yellow is relatively inconspicuous than that in cyan and magenta. Of course, discontinuity can be made inconspicuous by changing the division location s per color plate.

On the other hand, the division location s is preferably set such that image is divided as nearly equally as possible, in accordance with the number of recording heads. For instance, when the number of recording heads is two, an approximately central location of a printing plate is preferred. When the number of recording heads is four, such locations at which a printing plate is roughly divided into four are preferred. This is because the efficiency of concurrent operation of the individual recording heads is increased thus to shorten recording time. Therefore, the division location setting part 20 previously extracts all the candidate areas that include a complete blank area on a printing plate or the above-mentioned sparse-image area selected under the preset condition. Then, the division location setting part 20 sets a division location s by selecting from the extracted candidate areas a location at which the most nearly equal division is attainable. Although the division location s is automatically determined by the control part 4 in the foregoing, the operator may manually determine or select a division location s.

Following is one method of selecting a division location s by the operator. The present image recorder can use plural types of printing plates having different sizes etc. Therefore, in this image recorder, image recording condition can previously be registered per printing plate type used. Examples of the image recording conditions are the size and positive/negative characteristics of an image recordable area, the quantity of light of laser per resolution, and the like. As one of these image recording conditions, the above-mentioned division locations s are registered so as to correspond to the number of impositions. There are registered, for example, a division location sa when a 2-page-imposition image is recorded in a certain type of printing plate, and a division location sb when a 8-page-imposition image is recorded (these division locations sa and sb to be registered in advance are hereinafter referred to as a "registered division location"). This is true for other types of printing plates. When the operator designates the type of a printing plate used and the number of imposed pages to be recorded on the printing plate, the registered division location is to be read and set, as a division location information, to the scan-start-position setting part 21 and image data division part 22. With this configuration, merely by designating the type of a printing plate and the number of imposed pages recorded on the printing plate, a division location s can be set automatically thus to be efficient in operation.

As other method of selecting a division location s by the operator, it is possible to configure the following system comprising: displaying a printing plate image and an imposition image on a screen; and prompting the operator to directly input through the screen a division location by an input means such as a mouse or a keyboard. As a method of directly inputting a division location, the operator may directly input the coordinate of a desired division location. In an alternative method, a registered division location corresponding to the printing plate used and the number of imposed pages may be displayed on the screen so as to be overlapped with the printing plate image and imposition image, in order to wait for the operator's approval of the registered division location or a fine adjustment command from the operator.

The scan-start-position setting part 21 determines a scan starting position (the secondary scanning position) of each recording head, based on the above-mentioned division location. In general, both of a printing plate and image data are laid out in the secondary scanning direction with respect to the drum 1. Accordingly, the scanning area of each recording head is determined based on the image data size and the division location s. Referring to FIG. 5, by setting a division location s in a margin area db at the center of a printing plate, as indicated by alphabetic reference "s" in the drawing, first half and second half parts e1 and e2 with respect to the division location s can be recorded by the recording heads 2 and 3, respectively. Therefore, letting the primary scanning direction be directed from the upper to lower side as viewed in FIG. 5, the scan starting position of the recording head 2 can be set at an upstream point a in the first half part e1, and that of the recording head 3 can be set at an upstream point b in the second half part e2 (this point is identical with the division location s).

In the case of burning out the margin areas db shown in FIG. 5, the scanning area of the first half part e1 and the scanning area of the second half part e2, which are divided by the division location s, are preferably overlapped within the center margin area db. In the simplest manner, the scanning area of the recording head 2 for recording the first half part e1 is made slightly over the division location s, so that the area corresponding to the division location s is completely burned out. In another alternative, the scan starting position of the recording head 3 may be shifted slightly forward than the division location s.

Returning to FIG. 3, the image data division part 22 divides an image data by the above-mentioned division location s. After-division data d2 and d3 are supplied to the recording heads 2 and 3, respectively. The recording heads 2 and 3 store the image data d2 and d3 in memory and also perform drive control according to the individual beam columns, based on the image data d2 and d3 at recording image, respectively.

The head movement control part 23 initializes the recording heads 2 and 3 to their respective scan starting positions a and b, based on a scan starting position information obtained from the scan-start-position setting part 21. When recording is started, the head movement control part 23 drives the recording heads 2 and 3 so as to move concurrently at a predetermined secondary scanning rate. If it is necessary to stabilize the recording heads 2 and 3 at a certain secondary scanning rate prior to recording, the recording heads 2 and 3 may be initialized at a slightly upstream side than their respective scan starting positions a and b. A secondary scanning drive is then started and, when the feed rate is stabilized, an actual image recording is performed from their respective scan starting positions a and b.

An operation procedure of concurrent recording of the recording heads 2 and 3 in this image recorder will be described by referring to a flowchart in FIG. 4. First, in step S1, a division location s is set based on an image data d1. For setting the division location s, in a sub-step S10, every blank area having no image recorded in the primary scanning direction is extracted from the image data d1. In sub-step S11, if judged that other condition has been set, in sub-step S12, other candidate area is extracted under the above-mentioned other condition. For example, a sparse-image area containing less image parts to be recorded in the primary scanning direction is extracted. In sub-step S13, a division location s is set in an area, among the blank areas and other candidate areas that are extracted in sub-step S10 or S12, which is the nearest to a location at which image can be divided equally according to the number of recording heads.

In step S2, the scan starting positions a and b of the recording heads 2 and 3 are set based on the determined division location s. In step S3, the image data d1 is divided by the division location s. When the foregoing recording preparation is completed, the recording heads 2 and 3 are first initialized based on their respective scan starting positions a and b (step S4). The recording heads 2 and 3 are synchronized with the rotation of the drum 1 and driven to record image concurrently (step S5). When both images are recorded, image recording operation is terminated.

In the foregoing procedure, for the sake of simplicity, the respective steps are arranged in series. Since the operations of steps S2 and S4, and the operation of step S3 are independent from each other, these steps may be performed concurrently. The foregoing description is given on the assumption that the division location s is settable. However, if any setting is unattainable, image recording may be performed using only one of the recording heads. Alternatively, after interrupting the operation, the operator may reset a division location manually.

As a method of dividing an image data, the following methods can be considered. That is, an image data d1 is previously stored in memory and, at the time of image recording, the image data corresponding to scan lines of the respective recording heads are read concurrently from this memory and then supplied to the respective recording heads.

In an alternative method, an image data d1 is previously divided per division area as image data d2 and d3, and these image data d2 and d3 are stored in different memory areas. At the time of image recording, the image data d2 and d3 are read concurrently from their respective memory areas and then supplied concurrently to the respective recording heads.

A second preferred embodiment of the present invention will next be described. In this embodiment, a division location of image is determined by using the entire or part of an imposition data file to be created by an imposition operation.

Figure 6:
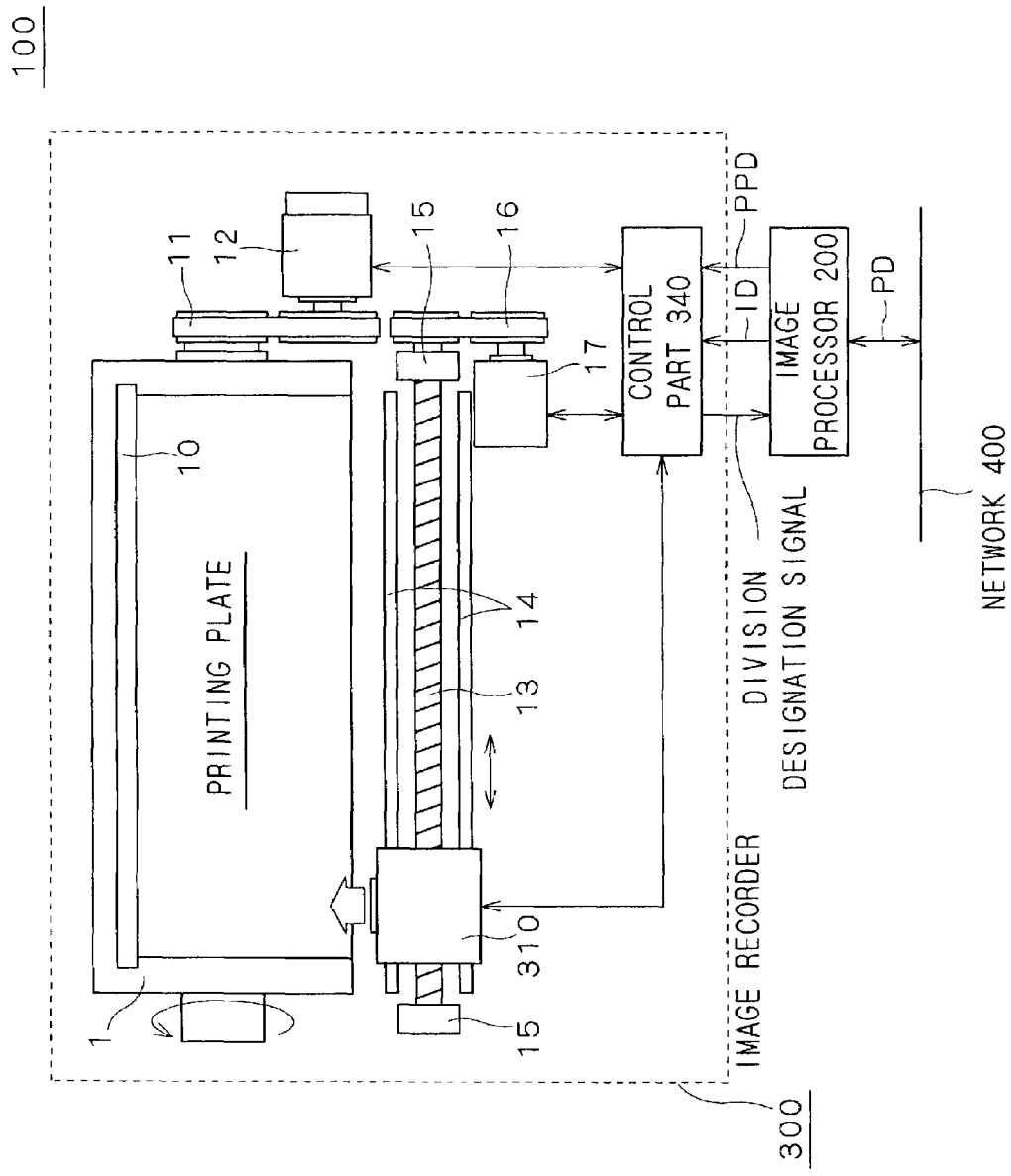
FIG. 6 is a schematic plan view showing one example of an image recording system according to the present invention.

FIG. 6 shows a main part of an image recording system 100 according to the second preferred embodiment. This image recording system 100 has an image processor 200 and image recorder 300. The image processor 200 is connected to a network 400, which is an in-house network such as LAN (local area network), or a wide area network such as the Internet, and performs communication of page data PD etc. to be described later. The image processor 200, which is connected to a control part 340 of the image recorder 300, supplies an imposition data ID and a print data PPD to the image recorder 300, and also receives a division designation signal from the image recorder 300. In an alternative, the image recorder 300 may also be connected to the network 400 so as to make communication with the image processor 200 via the network 400.

Figure 7:
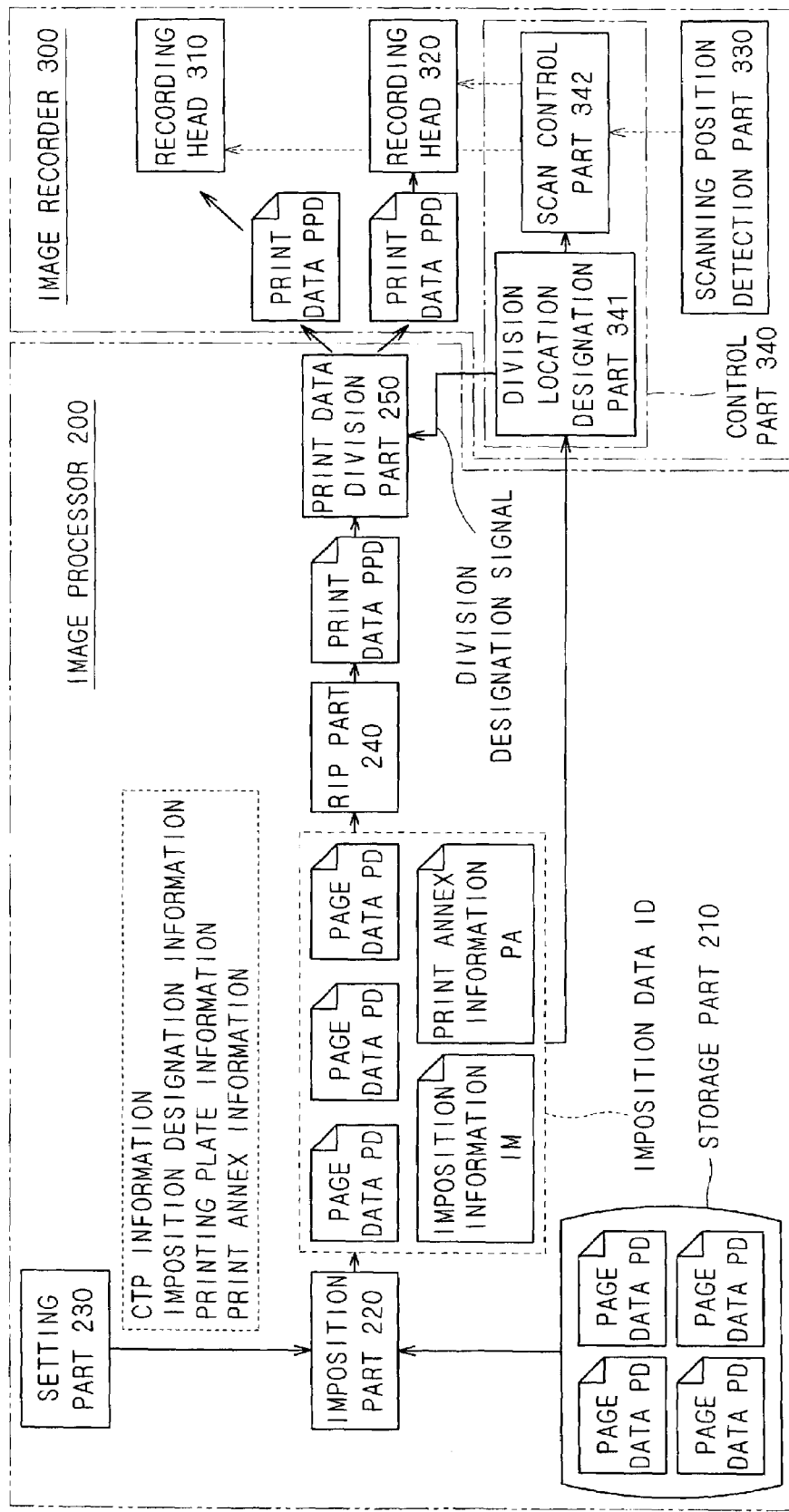
FIG. 7 is a functional block diagram of the image recording system in FIG. 6.

FIG. 7 is a functional block diagram of the image recording system 100 of the second preferred embodiment.

The image recording system 100 comprises an image processor 200 and an image recorder 300. The image processor 200 creates an imposition data ID by imposing plural page data PDn, such that print images of plural pages are printed on a single printing plate, then rasterizes and outputs the imposition data ID as a print data PPD. The image recorder 300 performs image recording to the printing plate fixed around the drum 1 by driving recording heads 310 and 320, based on the print data PPD outputted from the image processor 200.

Image Processor 200

The image processor 200 will be described below. The image processor 200 comprises a storage part 210, imposition part 220, setting part 230, RIP part 240, and print data division part 250.

The storage part 210 stores page data PD1, PD2, PD3, . . . PDn, which are created per page and described in a predetermined page description language in the step of making a printing plate that is the previous stage of the image processor 200. These page data PD1, PD2, PD3, . . . PDn are supplied via the network 400 to the storage part 210.

The imposition part 220 is a processing part that performs imposition for creating an imposition data ID (to be described later) by reading necessary page data PDn from the storage part 210 based on a designation from the setting part 230.

Specifically, in magazines and books in which two or more printed matters are bound (hereinafter referred to as a "publication"), unlike a single sheet of printed matter, a predetermined number of pages, such as 4 pages, 8 pages, or 16 pages, are printed on a single sheet. After folding this sheet up to the page size, it is bound and cut for finish. In this one-sheet printed matter as an aggregate of plural pages (hereinafter referred to as a "large page"), the plural pages are arranged in order when their folding is completed. A page layout (an imposition pattern) is determined depending on the holding manner and whether the book is turned over right or left. The imposition part 220 automatically imposes page data of plural pages in a printable area on a printing plate, based on the designated conditions, for example, (i) the recording resolution and the size of the printing plate as an imposition object, (ii) the page size; (iii) the manner of folding the printing matter and the direction in which the printed matter is turned over (i.e., to be turned toward the right or left), and (iv) the number of pages printed on one printing plate (e.g., four-imposition, eight-imposition, etc.). In this imposition operation, there is also performed designations related to print annexes such as a color patch used for measuring a color tone, a web rotary offset press mark, a register mark, and the serial number of a printing plate.

The setting part 230 is a processing part for setting to the imposition part 220 the following information necessary for an imposition.

(i) CTP information about the number of recording heads usable in the image recorder 300, recording resolution, the fixing allowance of the clamp member 10 in the drum 1, etc.

(ii) Printing plate information about printing plate sizes usable in the image recorder 300, etc.

(iii) Imposition designation information about specification of page data PDn to be imposed, the number of pages assigned per printing plate, folding manner, the direction of turning over, cutting margin, etc.

(iv) Print annex information for designating the type, content, and layout coordinate of print annexes (e.g., color patch and register mark).

The RIP part 240 is a processing part that interprets and rasterizes an imposition data ID thereby to create a print data PPD composed of binary data.

The print data division part 250 is a processing part for dividing the print data PPD that the RIP part 240 creates based on a division designation signal from the division location designation part 341 of the control part 340 in the image recorder 300.

Figure 8:
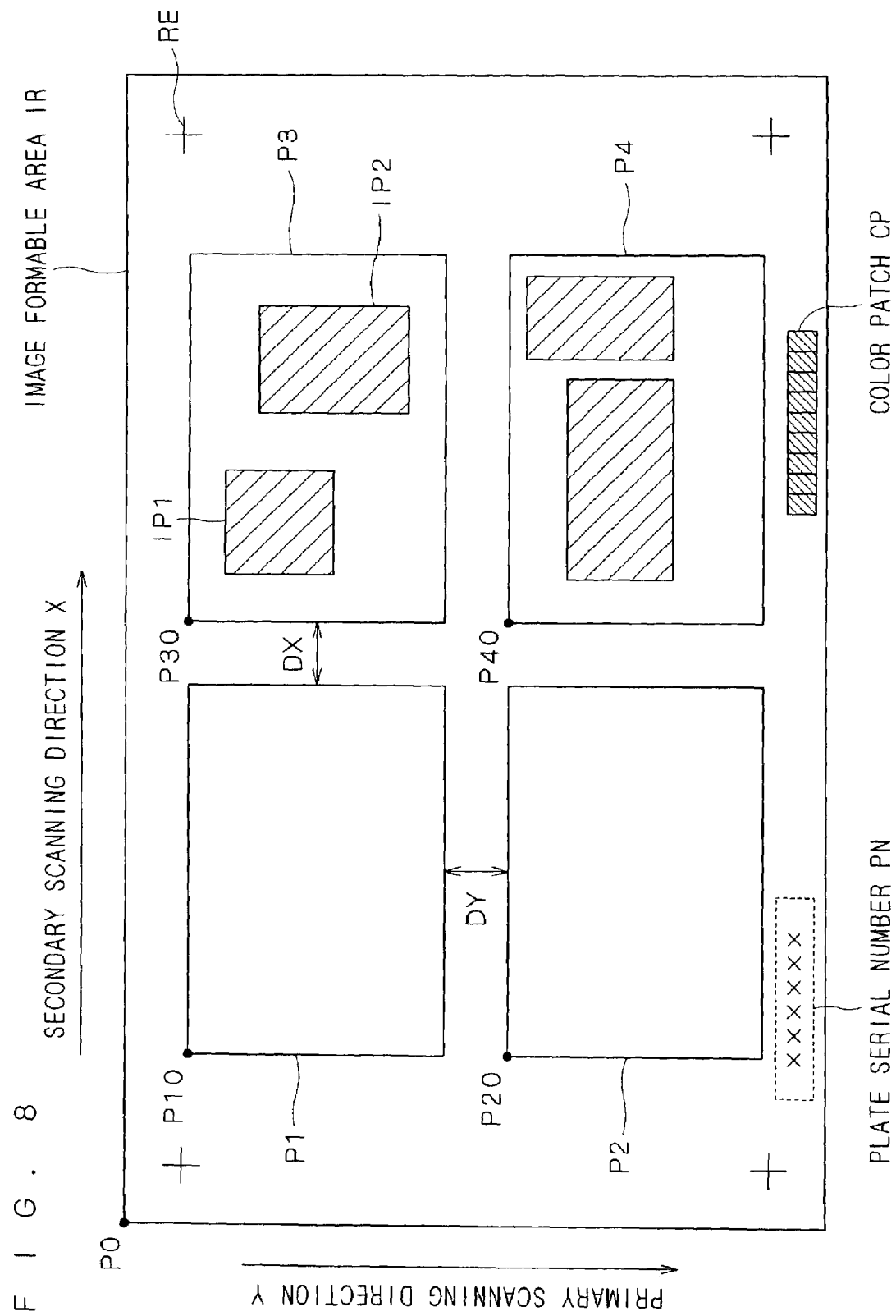
FIG. 8 is a diagram showing a layout image on a printing plate created by the image recording system in FIG. 6.

FIG. 8 shows a layout image of a printing plate to be created based on the imposition data ID in a subsequent stage of image recording.

In this instance, page data PD1 to PD4 are allocated on an image formable area IR of the printing plate. Areas on the printing plate in which images are formed based on the page data PD1 to PD4 are hereinafter referred to as "page areas P1 to P4", respectively. Image parts (also called "object") such as a picture, character, and line art image are allocated in the individual areas P1 to P4. Print annexes such as a color patch CP, register mark RE, and plate's serial number PN are recorded around the page areas P1 to P4. The size of the image formable area IR is determined by the printing plate size and clamping allowance.

The direction and layout location of each page are automatically determined in consideration of the above-mentioned printing plate information, imposition designation information, and print annex information. In this instance, the page areas are equally spaced away from one another by distance DY with respect to a Y direction that is the primary scanning direction, and distance DX with respect to a X direction that is the secondary scanning direction. The layout locations of the page areas P1 to P4 are defined by the respective page area offsets P10, P20, P30, and P40 from a zero point P0 of the image formable area IR, and X-direction and Y-direction sizes from the respective page areas P1 to P4.

Fine adjustment of the layout location of the page areas and a print annex can be accomplished by the setting part 230.

Figure 10:
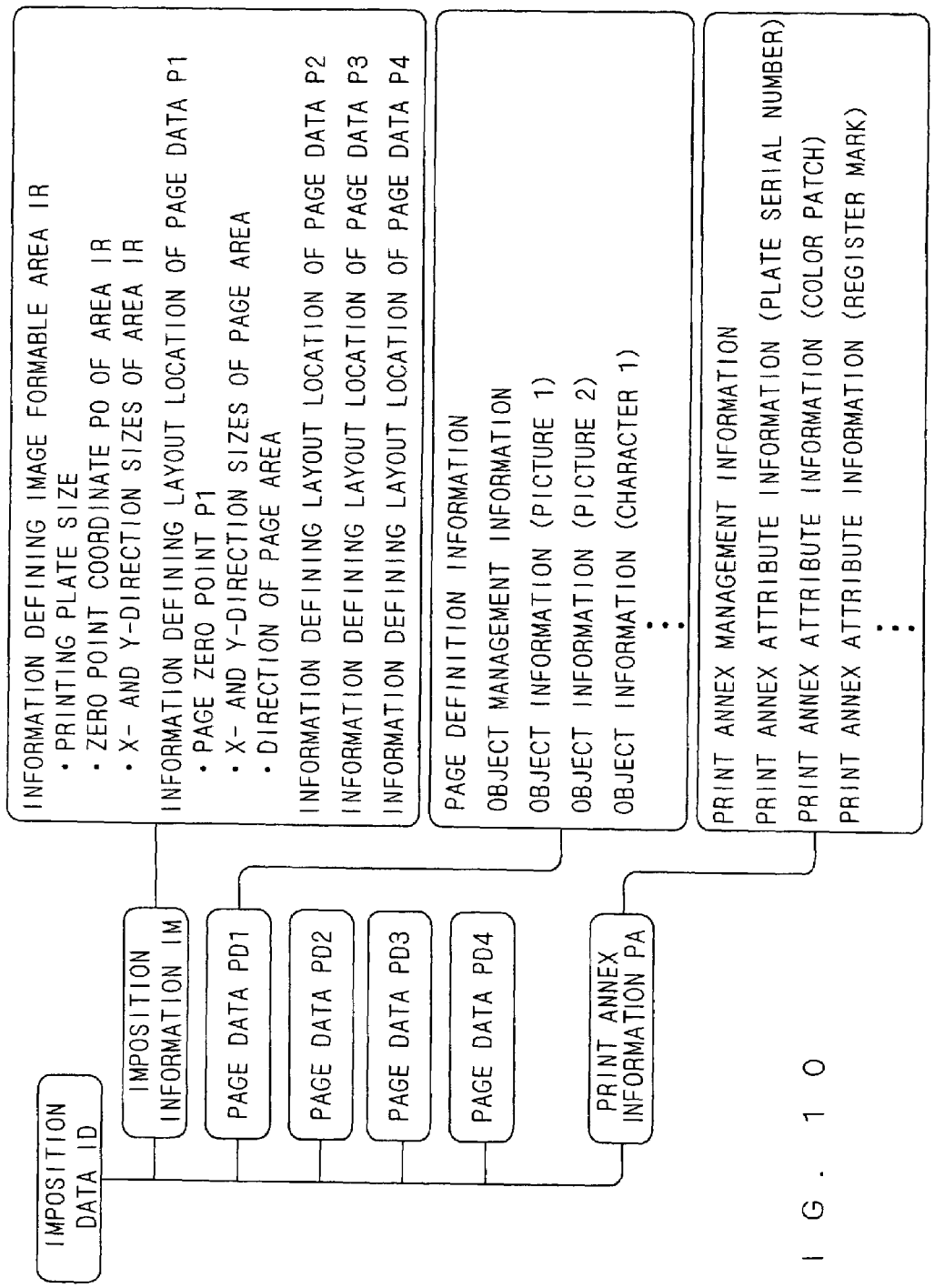
FIG. 10 is an explanatory diagram of the structure of an imposition data used in the image recording system in FIG. 6.

FIG. 10 is an explanatory diagram of the structure of an imposition data ID. The imposition data ID contains an imposition information IM, page data PD1 to PD4, and a print annex information PA.

The imposition information IM is information to define an image formable area IR and the layout location of each page area in the image formable area IR. Specifically, the imposition information IM contains information to define an image formable area IR (printing plate size, a zero point coordinate P0 of the image formable area IR, X-direction and Y-direction lengths of the area IR), as well as information to define the layout locations of the respective page areas such as a layout information about page n (e.g., a zero point Pn0 of the page, X-direction size PnX and Y-direction size PnY in the page area, and the page direction).

The page data PDn is equivalent to an actual data of each page which is composed of a page definition information to define the page such as the print color of the page (e.g., C-plate, M-plate, Y-plate, or K-plate); an object management information to manage objects such as pictures, characters, and line art images; and object information. The object management information contains information about the coordinates and types (picture, character, and line art) of the individual objects contained in the page. The individual object information contains data necessary for materializing the object, to which an identification name (e.g., "picture 1," picture 2," or "character 1") is appended as follows: a bit map data to a "picture" object; a color data indicting character display color, a code data, etc. to a "character" object; and a vector data indicating a color data and a line art shape to a "line art" object.

The print annex information PA is composed of a print annex management information for managing each print annex, and a print annex attribute information for indicating the content, type, and coordinate of each print annex.

Image Recorder 300

Returning to FIGS. 6 and 7, the image recorder 300 of the second preferred embodiment will be described. The image recorder 300 comprises a drum 1 that can rotate while holding a printing plate; two recording heads 310 and 320 movable in an axial direction of the drum 1; a scanning position detection part 330; and a control part 340 to control the image recorder 300, like the image recorder of the first preferred embodiment. The physical relationship between the drum 1 and recording heads 310 and 320 is the same as that between the drum 1 and recording heads 2 and 3, which has been described in the first preferred embodiment (see FIG. 1 and FIG. 2). Therefore its detail description is omitted here. A description of the state that a recording material such as a printing plate is held on the drum 1 is also omitted here.

The scanning position detection part 330 is a processing part for detecting the secondary scanning positions of the recording heads 310 and 320. That is, the detection part 330 detects their respective secondary scanning positions based on signals from a secondary scanning position detection part such as a known rotary encoder coupled to drive motors 17 and 17, by which the recording heads 310 and 320 are individually moved in the secondary scanning direction.

The control part 340 comprises a division location designation part 341 and a scan control part 342. The division location designation part 341 is a processing part for judging, based on the entire or part of an imposition data ID created by the imposition part 220 of the image processor 200, a division location at which a print data PPD supplied from the image processor 200 can be divided most efficiently. The division location designation part 341 also converts the division location to a division designation signal and sends this to a file division part 250 of the image processor 200. The division location designation part 341 also transmits a division location to the scan control part 342, in order that the recording heads 310 and 320 start image recording from their respective division locations set by the designation part 341. Concrete processing contents of the division location designation part 341 will be described later. The scan control part 342 is a processing part that controls, by referring to the secondary scanning positions of the recording heads 310, 320 to be sent from the scanning position detection part 330, the drive motors 17, 17 in the recording heads 310, 320, and a processing part for driving light emitting parts mounted on the recording heads 310, 320, so that the recording heads 310 and 320 start image recording from their respective division locations transmitted by the division location designation part 341.

Processing Procedure

Processing in the image recording system 100 will be described by mainly referring to FIG. 11.

Figure 9:
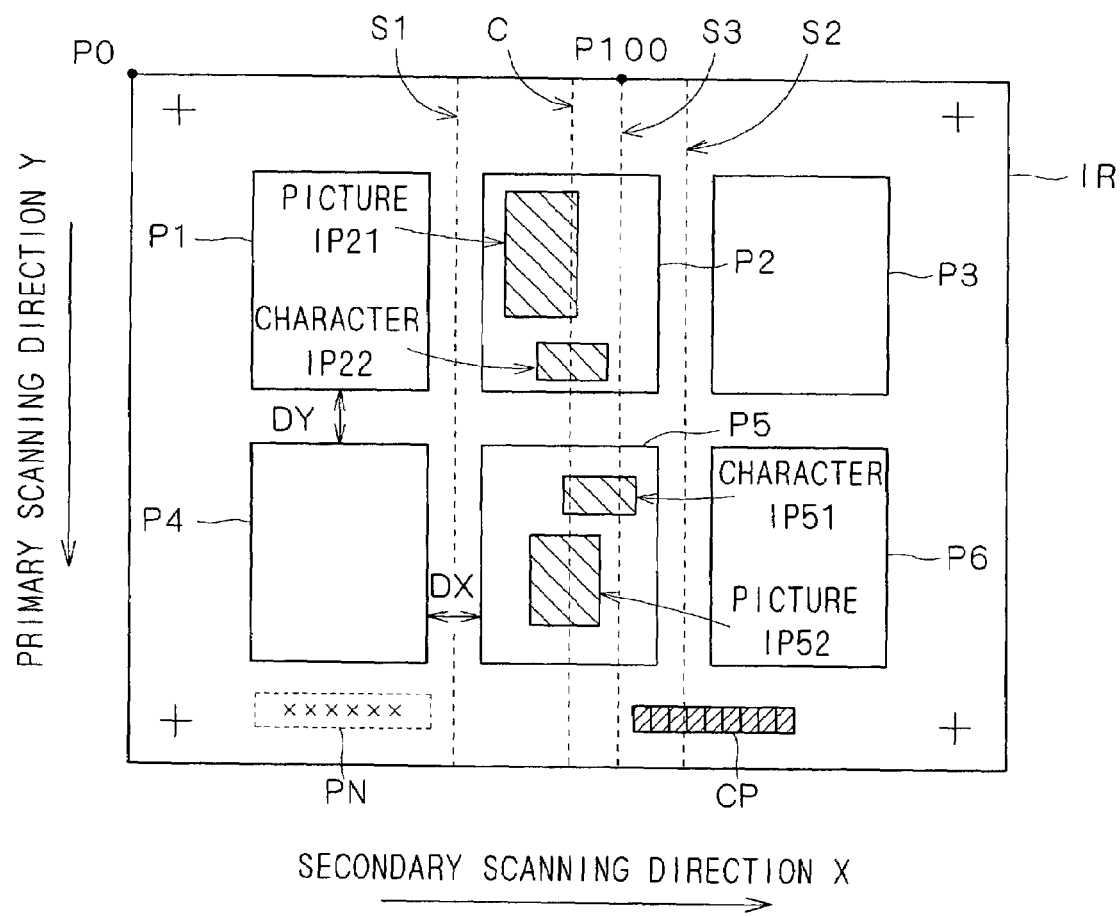
FIG. 9 is a diagram showing other layout image on a printing plate created by the image recording system in FIG. 6.

First, an imposition data ID is created by the imposition part 220 (step S110). A layout image of a printed matter created by this imposition is shown in FIG. 9. In this instance, six page areas P1 to P6 are allocated to an image formable area IR.

Then, a division location setting operation performed by the division location designation part 341 of the image recorder 300 (step S120), and a rasterization operation to the imposition data ID performed by the RIP part 240 (step S130) are executed concurrently.

Subroutine S120

Referring to FIGS. 9 and 12, the division location setting operation (step S120) will be described in detail. FIG. 12 is a flowchart of a subroutine of the division location setting operation. The division location designation part 341 first reads an imposition information IM and a print annex information PA contained in an imposition data ID, from the imposition part 220 (step S121). As previously described, the imposition information IM contains the size of a printing plate, the size of an image formable area IR, and the zero point coordinate P0 of the image formable area IR. Therefore, based on these information, the division location designation part 341 can set a center line C in the secondary scanning direction X of the image formable area IR.

The imposition information IM also contains information for defining the layout locations of the page areas P1 to P6 each being imposed on the printing plate. Therefore, by reading this information, the division location designation part 341 can recognize the layout locations of the individual page areas P1 to P6 in the image formable area IR, and also recognize a blank area (so-called "center margin") between the page areas.

In addition, the division location designation part 341 can recognize the layout location of a print annex in the image formable area IR, by reading the print annex information PA and referring to the print annex attribute information contained therein.

Subsequently, the division location designation part 341 selects and extracts, as a division location candidate, one or more lines in parallel to the primary scanning direction Y which are not overlapped with any page areas P1 to P6 (preferably, any print annex). In the instance of FIG. 9, division location candidates S1 and S2 correspond with such lines (step S122).

Subsequently, the division location designation part 341 judges whether the division location candidates extracted in step S122 are proper in the viewpoint of performing image recording by plural printing heads (step S123). That is, it is judged whether the extracted division location candidates S1 and S2 are sufficiently close to a center line C of the image formable area IR. Specifically, it is judged whether the number of pixels between the center line C and the extracted division location candidates S1, S2, is less than a predetermined value or not. This is because it is the most efficient to equally divide the image by the number of recording heads if the secondary scanning rates of the recording heads are the same. However, if not the same, the criterion of judgment might be changed from the center line C of the image formable area IR to a certain location in response to the secondary scanning rate of the individual recording head.

When the extracted division location candidates divide the image formable area IR by a location adjacent to the center line C, the procedure goes to step S125A or S125B, depending on the division location candidate that has been judged as being proper. As the result, this division location candidate is set as a division location.

In the instance of FIG. 9, neither the division location candidate S1 nor S2 is adjacent to the center line C. Accordingly, if the judgment result of step S123 is that "both are improper," the procedure goes to step S124.

When the distance from the center line C to the division location candidate S1 and the distance from the center line C to the division location candidate S2 are the same, one that is not overlapped with any print annex is selected. In this instance, the division location candidate S1 is selected because only the division location candidate S2 is overlapped with a print annex (color patch CP).

In step S124, the page definition information and object management information contained in the page data PD are read out.

Since the object management information contains the attributes of image parts present in the page area, the division location designation part 341 can recognize the types and coordinates of these image parts by referring to this information. The division location designation part 341 can extract such a division location candidate that can make the division location the most inconspicuous when image recording is performed using the individual recording heads. That is, it is undesirable to divide a page area at a division location overlapping with an image part of "picture" because its image quality might deteriorate. On the other hand, it can be considered that image quality is not appreciably deteriorated even when a page area is divided at a division location overlapping with an image part of "character" or "line art."

Based on this concept, the division location candidate S3 is extracted which passes through the page areas P2 and P5 that are the nearest to the center line C (step S126). As shown in FIG. 9, the division location candidate S3 that passes through the page areas P2 and P5, and also is a line parallel to the primary scanning direction Y. The candidate S3 is set so as to overlap only with a "character" image part IP51 that is relatively inconspicuous even if divided, and so as not to overlap with "picture" image parts IP21 and IP52 that might affect image quality if divided. In the above step S126, the division location candidate S3 may be extracted by the following steps of: recognizing the print color of each page area by referring to the page definition information of the page data PDn; and extracting a line that is parallel to the primary scanning direction and passes through a page area of a print color (e.g., yellow) in which the division location is the most inconspicuous.

In the foregoing, the plural division location candidates S1 to S3 are extracted based on different types of information contained in the imposition data ID. That is, the division location candidates S1 and S2 have been extracted based on the imposition information IM and print annex information PA in step S122, and the division location candidate S3 has been extracted by further referring to the page data PDn in step S126. In order to reduce time needed in judgment, division location candidates may be determined based on the imposition information IM alone.

From a general point of view, a single division location is selected in the next step S127. That is, the division location candidate S3 closest to the center line C of the image formable area IR can produce the most efficient operations of the recording heads 310 and 320. However, the division at the division location candidate S3 might cause loss of image quality because the images of page areas P2 and P5 are divided. On the other hand, since the division location candidate S1 or S2 divides no image of every page area, there is no damage to image quality. However, the operating efficiency of the recording heads 310 and 320 is lowered due to an uneven image division. In the case that every extracted division location candidate can affect image quality to a certain degree or more, a non-execution of image division is selectable when the primary consideration is image quality.

In step S127, a single division location is selected in consideration of the foregoing conflicting advantage and disadvantage. In place of automatic selection, the operator may select a desired division location manually.

According to the judgment result of step S127, the procedure goes to the next step. That is, if judged that no image division should be made, it goes to step S128. In this instance, no division location is set. On the other hand, when one of the division location candidates S1 to S3 is selected, it goes to step S129A, S129B, or S129C, depending on which candidate is selected, and the selected candidate is set as a division location, thereby terminating the subroutine of step S120. Following is the instance when the division location candidate S3 is selected as a division location.

Returning to FIG. 11, when both of the division location setting operation (step S120) and the RIP processing (step S130) are terminated, the procedure goes to a print data division operation (step S140).

In step S140, the division location designation part 341 sends the print data division part 250 a division designation signal for dividing a print data PPD by the division location set in the above-mentioned step S129A, S129B, or S129C. Based on the signal, the print data division part 250 divides the print data PPD. In the absence of a division location, the print data PPD remains undivided.

In the next step S150, the scan control part 342 sets scan starting positions of the recording heads 310 and 320. Specifically, the zero point P0 of the image formable area IR is set as the scan starting position of one of these recording heads, and point P100 at which the division location S3 intersects the outline of the image formable area IR is set as the scan starting position of the other recording head. Following is the instance that the zero point P0 of the area IR is set as the scan starting position of the image recording head 310 and the point P100 of the area IR is set as that of the image recording head 320.

On completion of the scan start position setting to both of the recording heads 310 and 320, the scan control part 342 directs the recording heads 310 and 320 to move to their respective scan starting positions P0 and P100 (steps S160A, S160B). At the same time, a high-speed rotation of the drum 1 is initiated. The scan control part 342 directs the recording heads to initiate recording and scanning in the order of their arrival at the scan starting position P0 or P100 (steps S170A, S170B). Since the recording heads 310 and 320 are constructed so as to avoid mutual interference, no problem occurs when both are operated concurrently. Based on the print data PPD divided in step S140, the recording heads 310 and 320 control the light emitting devices in order to perform a concurrent image recording to the printing plate fixed on the drum 1. On completion of the both image recordings, the image recording operation is terminated.

The image recording system 100 of the second preferred embodiment determines the division location of a print data by referring to a before-rasterization imposition data ID, although an after-rasterization image data contains massive amounts of data. This leads to a reduction in the amount of data that the image recording system 100 refers to, thereby decreasing time needed in the division location determination operation. In addition, it is possible to refer to the individual page data PDn contained in the imposition data ID. Therefore, the print data can be divided by a location that exerts less influence on image quality.

Although the division location setting operation (step S120) and the RIP processing (step S130) are performed concurrently in the second preferred embodiment, if a relatively short time is required in the division location setting operation, the RIP processing may be performed after the division location setting operation. In this instance, instead of dividing a single print data file created by the RIP processing (step S130), the RIP part 240 creates in advance two print data files that are respectively divided at the above-mentioned division location, in consideration of the division location set by the division location designation part 341. Therefore in this instance, the print data division part 250 disposed at the subsequent stage of the RIP part 240 is unnecessary.

Although the division location designation part 341 is disposed within the image recorder 300 in the second preferred embodiment, it may be disposed within the image processor 200.

Although the image made by imposing plural page images is recorded on the printing plate fixed on the drum 1, the present invention is also applicable in the case of recording an image made by imposing only one page image. In this instance, the division location of the image is determined according to the attribute of image parts contained in the page.

Further, the present invention is applicable to the instance that plural printing plates are fixed on the drum. In this instance, an image division location is set in a joint gap between the printing plates in the secondary scanning direction.

Other Preferred Embodiments (1) Although the drum 1 in cylindrical outer surface shape is used for holding the recording material in the foregoing preferred embodiments, the present invention is also applicable to the so-called internal cylinder type image recorder in which a recording material is held in an internal cylinder and a recording head is subjected to rotary scanning in the cylindrical inside face.

(2) Although the recording heads 2 and 3 (310 and 320) travel on the individual guide rails in the foregoing preferred embodiments, they may travel on the same guide part disposed along the drum 1 as has been conventional.

(3) Although the after-RIP development binary image data d1 is analyzed to set a division location in the first preferred embodiment, a judgment may be made by the layout of a before-RIP image data. For example, with respect to the imposed image data as shown in FIG. 5, the division location s is selectable by finding the location of a center margin area db from a before-RIP layout data etc.

(4) Instead of one printing plate, two or more printing plates may be fit into the drum 1, and recording heads corresponding to the number of the printing plates perform image recording to their respective printing plates.

(5) If it is difficult to set a division location, image may be recorded by either of recording heads, without dividing the image. If one of the recording heads is in trouble, the remaining normal operable recording head(s) may perform image recording. In this instance, the number of divisions must be changed depending on the number of operable recording heads.

While the invention has been shown and described in detail, the foregoing description is in all aspects illustrative and not restrictive. It is therefore understood that numerous modifications and variations can be devised without departing from the scope of the invention.

What is claimed is:

1. An image recording system that comprises an image data supply part for supplying an image data; a holding part for holding a recording material of said approximately cylindrical shape; and plural recording heads movable in an axial direction of said approximately cylindrical shape and capable of individually scanning over said recording material, and that records image on said recording material by scanning over said recording material while driving said plural recording heads based on said image data, said image recording system comprising:

a division location setting part that sets a division location of said image data based on image layout information in said image data created by an image processing apparatus for assigning page data and image parts;

an image data division part that divides said image data into plural division areas based on said division location so set;

a scan start position setting part that sets scan start positions of said plural recording heads so as to correspond to said plural division areas, respectively; and a head movement control part that directs said plural recording heads to movably scan in said axial direction from said scan start positions so set, so that said plural recording heads perform image recording concurrently, wherein said image layout information contains page data layout information for allocating page data on a large page as an aggregate of plural pages, said image layout information further contains information about types of image parts for allocating the image parts on said large page and for indicating that each image part is either a pattern, a character, or a line drawing, and said division location setting part, by referring to said information about the types of image parts, sets said division location so as to avoid an overlap of an image part that is a pattern and said division location.

2. An image recording method for recording image on a recording material by scanning over said recording material based on an image data, comprising the steps of:

holding a recording material in an approximately cylindrical shape;

setting a division location of said image data based on image layout information in said image data created by an image processing apparatus for assigning page data and image parts;

dividing said image data into plural division areas by said division location so set;

setting scan start positions of plural recording heads so as to correspond to said plural division areas, respectively; and directing said plural recording heads to movably scan in said axial direction of said approximately cylindrical shape from said scan start positions so set, so that said plural recording heads perform image recording concurrently, wherein said image layout information contains page data layout information for allocating page data on a large page as an aggregate of plural pages, said image layout information further contains information about the type of image parts for allocating the image parts on said large page and for indicating that each image part is either a pattern, a character, or a line drawing, and said division location is set by referring to said information about the type of image parts so as to avoid an overlap of an image part that is a pattern and said division location.

\* \* \* \* \*